INVENTOR.
Rufus F. van Deinse
BY Rice and Rice
ATTORNEYS.

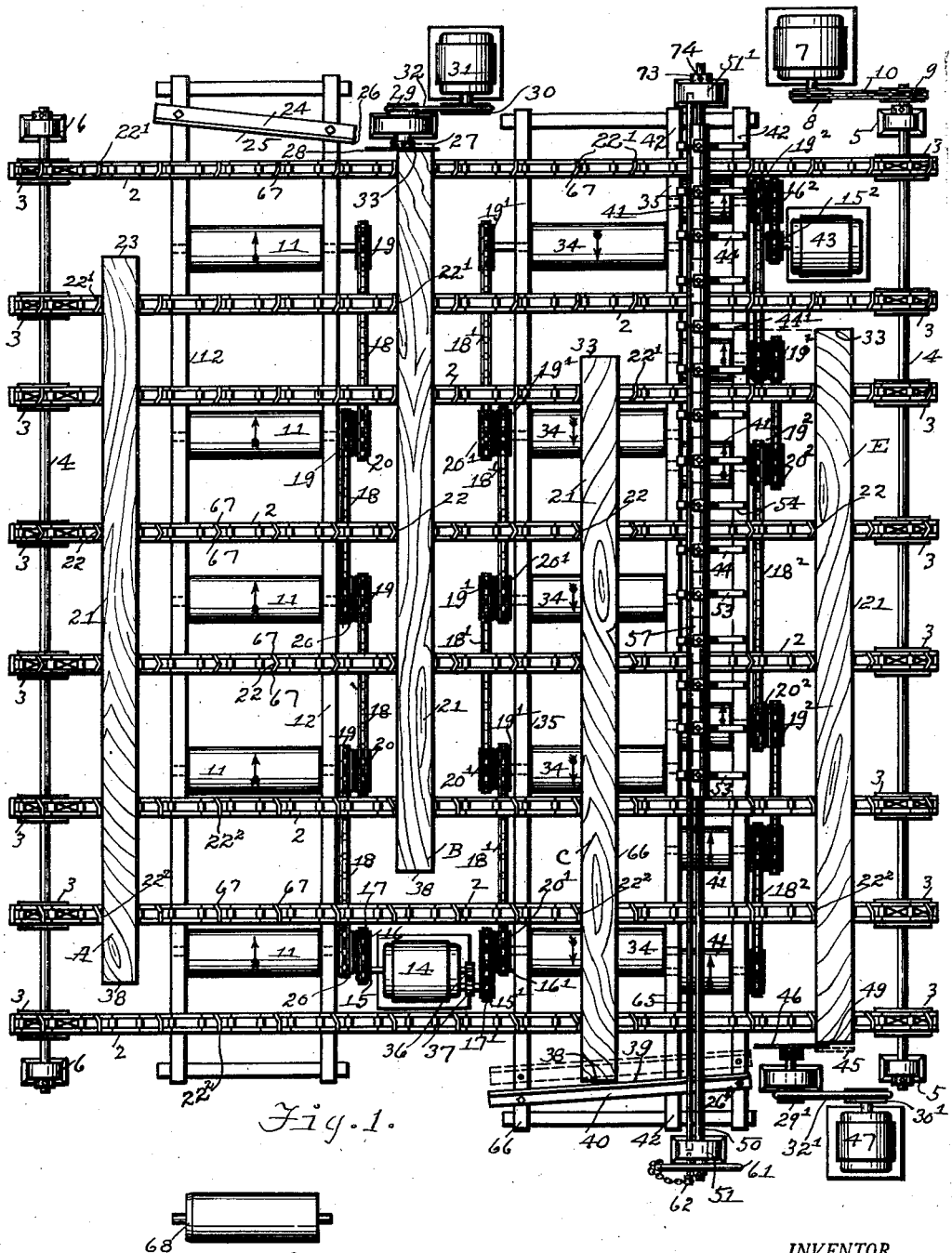

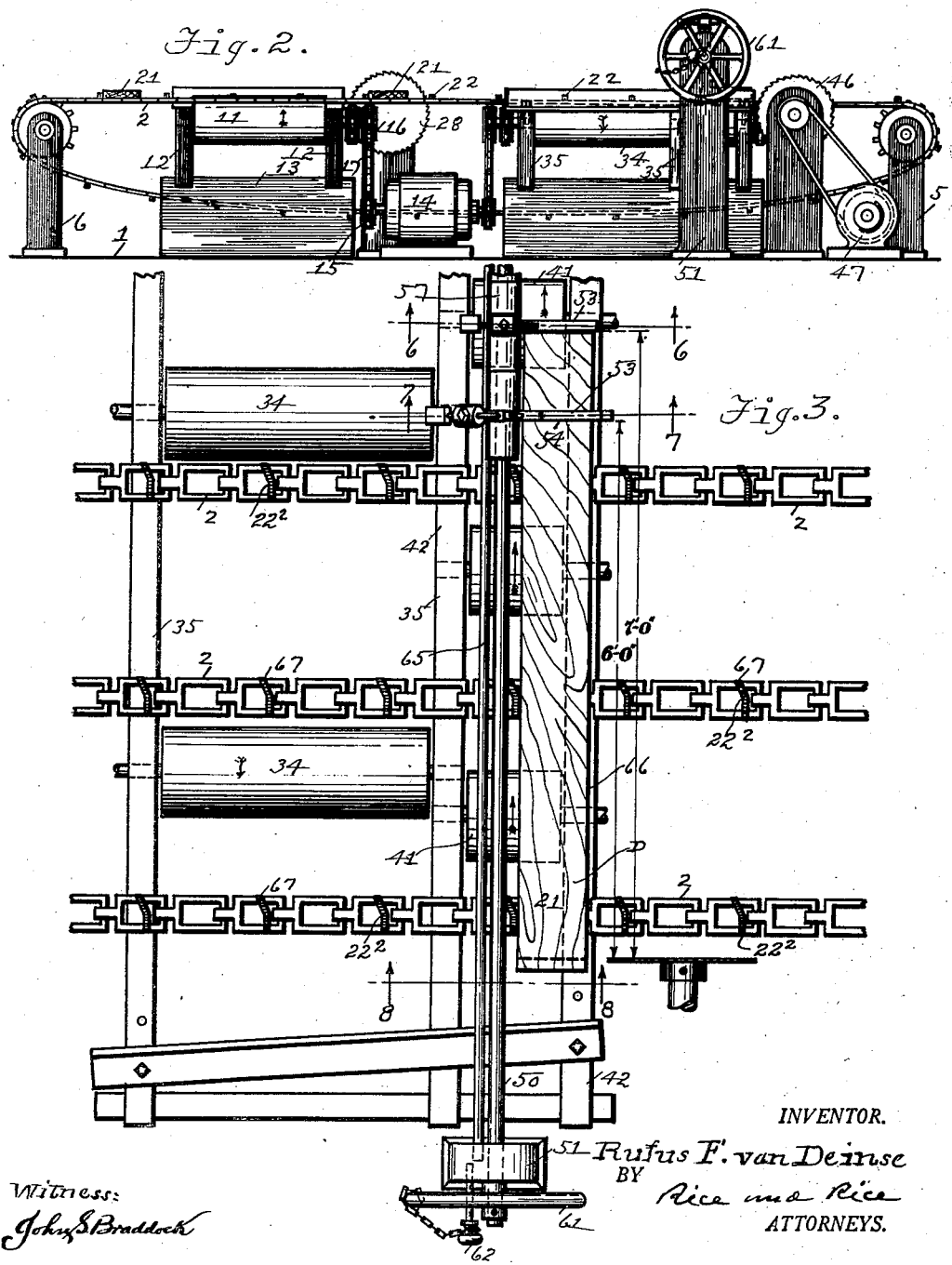

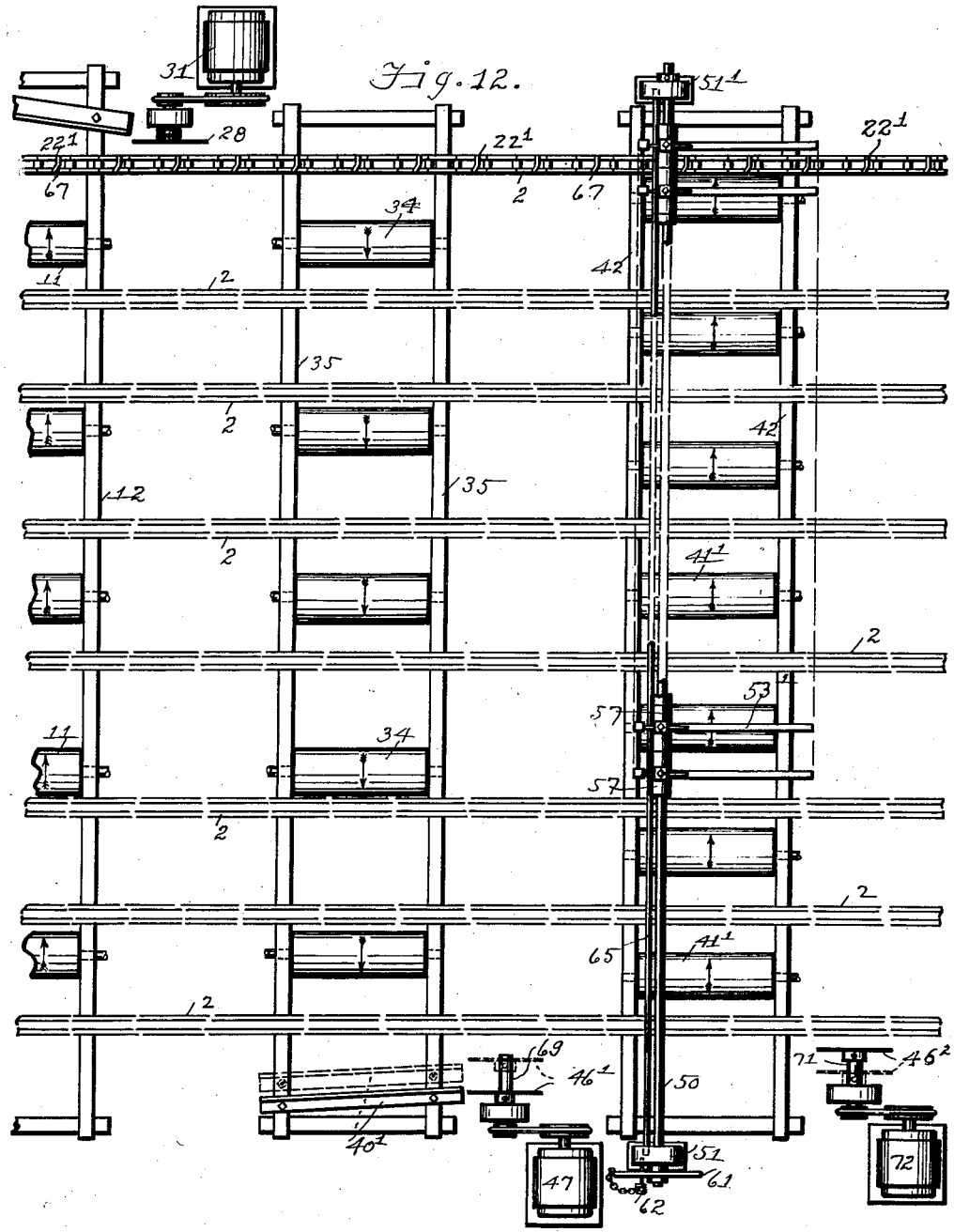

Aug. 19, 1941.   R. F. VAN DEINSE   2,253,453
MACHINE FOR REDUCING LUMBER TO DESIRED LENGTHS
Filed Dec. 21, 1938   5 Sheets-Sheet 5
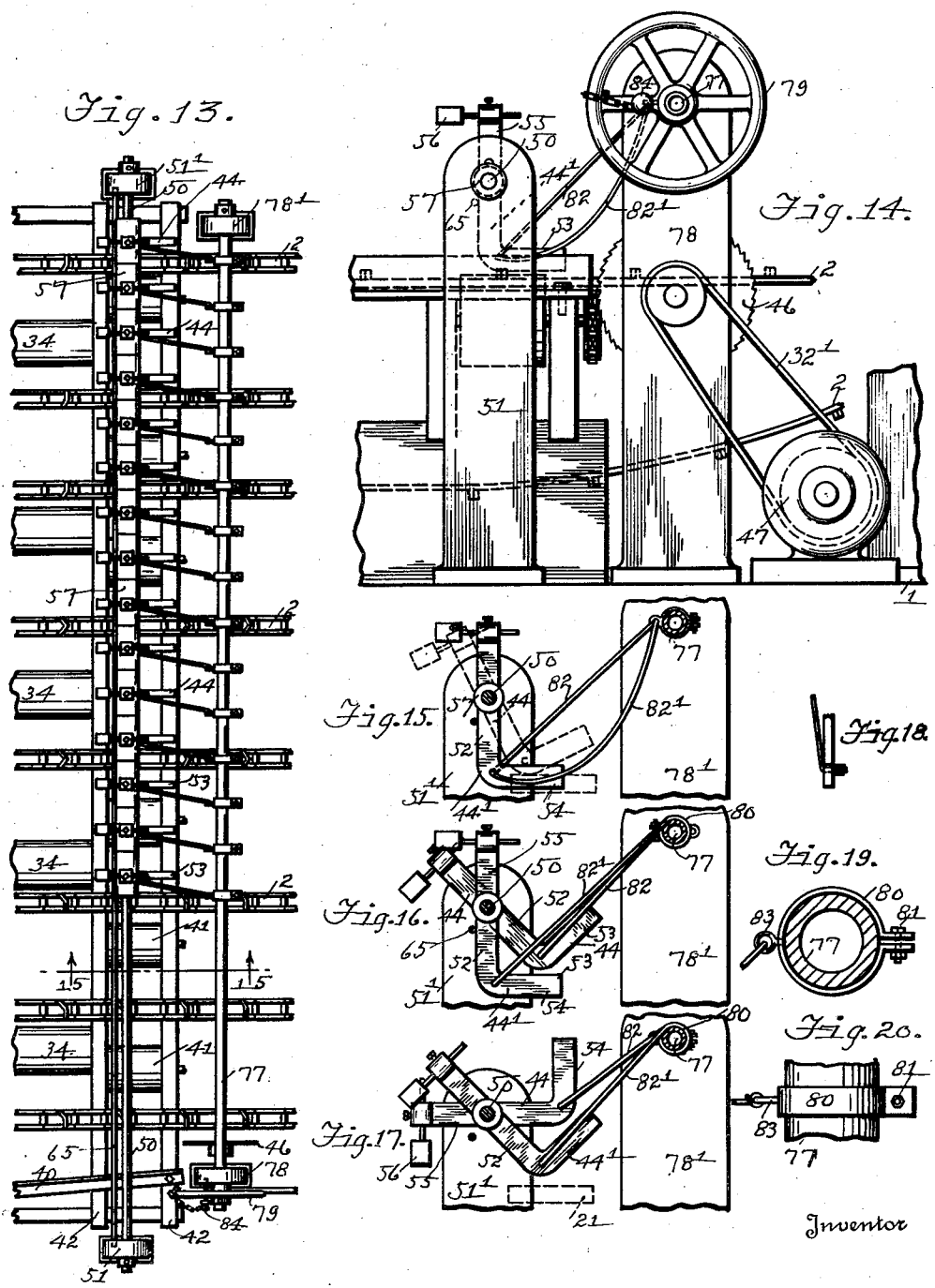

Patented Aug. 19, 1941

2,253,453

UNITED STATES PATENT OFFICE 2,253,453

MACHINE FOR REDUCING LUMBER TO DESIRED LENGTHS

Rufus F. van Deinse, Oswego, Oreg.

Application December 21, 1938, Serial No. 246,990

2 Claims. (Cl. 143—48)

The present invention relates to machines for severing the end portions of lumber and the like therefrom and for reducing the lumber to desired finished lengths; and its object is, generally, to provide an improved machine of this character; and particularly, to provide such a machine having, in combination, means for severing such end portions respectively, means for moving the lumber longitudinally in opposite directions alternately to a position registering with one of the severing means and to an oppositely stopped position, means for reversely moving the lumber to a stopped position registering with the other severing means, and means for moving the lumber laterally into the operation of the means whereby the same is longitudinally moved, and for laterally moving the same relatively to the severing means for severing the end portions respectively; and further, to provide such a machine having some of such parts in combinations; and further, to provide in such a machine improved devices, operating and structural parts, whereby said objects are attained.

These and any other and more specific objects hereinafter appearing are attained by, and the invention finds preferable embodiment in, the illustrative machine and structure particularly described in the body of this specification and illustrated by the accompanying drawings, in which:

Figure 1 is a top plan view of my machine for severing the opposite end portions of lumber or like work pieces therefrom and for reducing the same to desired lengths;

Figure 2 is an elevational end view thereof;

Figure 3 is a top plan view (enlarged) of parts of the same seen in the right-hand lower corner portion of Figure 1;

Figures 6, 7:
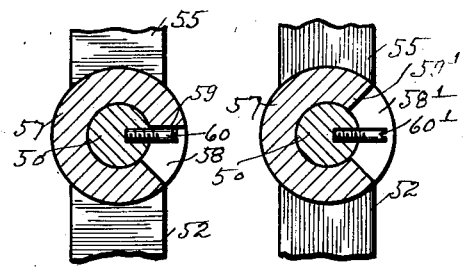
Figure 8:
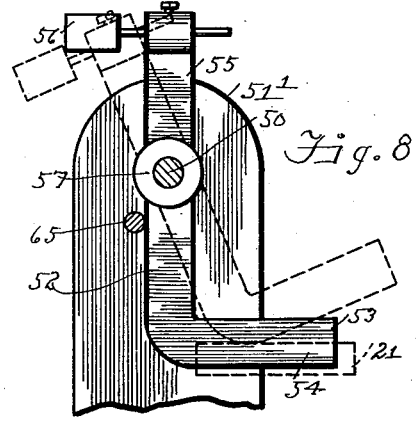
Figure 10:
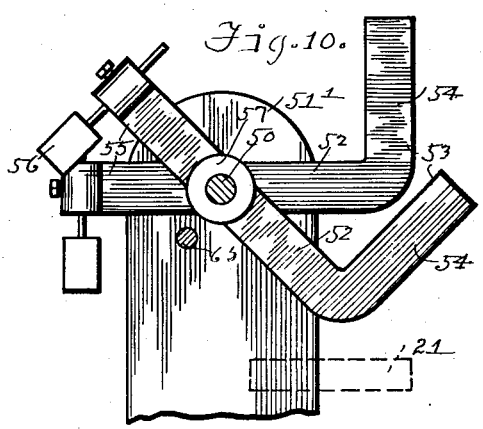
Figure 9:
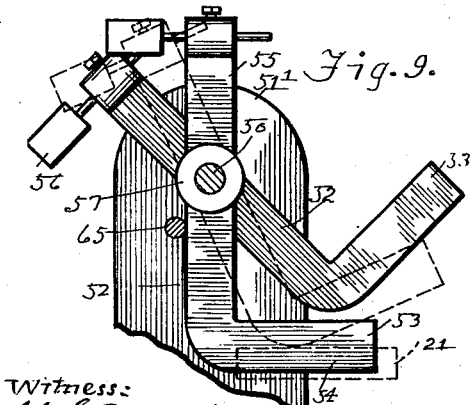

Figures 6 and 7 are detail vertical sectional views (enlarged) of parts of the machine, taken on lines 6—6 and 7—7 respectively of Figure 3;

Figures 8, 9 and 10 are detail vertical sectional views (enlarged) of parts of the machine, taken on line 8—8 of Figure 3, and showing said parts in different positions;

Figure 11 is a detail view of one of the rolls of the machine and showing a slightly modified construction thereof;

Figure 12 is a top plan view of a portion of the machine and illustrating a modified construction thereof;

Figures 13-20 illustrate a modified construction of parts of the machine, Figure 13 being a top plan view of said construction, Figure 14 an (enlarged) elevational end view thereof, Figures 15, 16 and 17 detail vertical sectional views of parts of the same taken on line 15—15 of Figure 13 and showing said parts in different positions corresponding to Figures 8, 9 and 10 respectively, Figure 18 being a side view of a portion of one of the stop members with an operating cord attached thereto, Figure 19 being a cross-sectional view of an operating hollow shaft with a collar thereon to which the other end of the cord is attached, and Figure 20 being a top plan view thereof.

The parts of the machine illustrated by these drawings are shown mounted on a suitable horizontal base 1, and are particularly described and operate as follows.

A plurality of parallelly spaced chain conveyer belts 2 are carried on the sprocket wheels 3 of parallel shafts 4, rotatable on pairs 5, 6 of posts at the opposite sides of the machine and are travelled or driven by an electric motor 7 on the sprocket wheel 8 of whose shaft and the sprocket wheel 9 of one of said shafts a chain belt 10 is carried. A series of rolls 11 are turnable about axes at right angles to the shafts 4 and are journalled on spaced horizontal bars 12 seated in notches in the upper edges of frame members 13 and are driven in the direction of the arrows thereon by an electric motor 14 on the sprocket wheel 15 of whose shaft and the sprocket wheel 16 of one of the rolls a chain belt 17 is carried, chain belts 18 being carried by the sprocket wheels 19, 20 of mutually adjacent rolls. An elongated work piece—a strip of lumber 21—shown in five successive positions designated A, B, C, D and E in the drawings, being laid in its position A on the horizontal upper portions or halves of the belts and engaged by their vertical arms 22, is positively moved laterally toward the right hand side of Figures 1, 2 and 3 by the travel of the belts and is thus carried onto the rolls 11 which are positioned between the belts with their upper surfaces slightly above the upper surfaces thereof, whereupon the work piece is moved longitudinally by the frictional contact of the rolls therewith toward the upper end of Figure 1 until stopped in its longitudinal movement by its forward end 23 striking the surface 25 of the stop-guide member 24 this surface being inclined toward the lower end and the right hand side of Figure 1. Said end 23 is, by frictional action of these rolls on the work piece, held in contact with said surface 25 so that the work piece is slid on the rolls for a short distance rearwardly (toward the lower end of this view), and by the combined action of said member 24 and the travel of the belts the work piece is moved laterally, and as said end 23 slides laterally along the end 26 of member 24 the work piece's end portion 27 (which may be rough or otherwise imperfect) is carried (in the work piece's position B) into and through the field of operation of severing means, the circular saw 28 whose shaft's sprocket wheel 29 and the sprocket wheel 30 of an electric motor 31 carry the driving belt 32. Said end portion 27 is thus cut off and the work piece is given a finished end 33 at right angles to its side.

The continuing movement of the belts now moves the work piece from its position B laterally onto a second series of rolls 34, rotatable about axes parallel with those of the rolls 11 and journalled between the belts on bars 35, with their upper surfaces slightly above the belts, these rolls 34 being driven, in the direction opposite to the rolls 11, by the same motor 14 having reversing gears 36, 37, and said motor and rolls 34 having sprocket wheels $15^1$, $16^1$, $19^1$, $20^1$ and driving chain belts $17^1$, $18^1$ as shown similar to those shown in connection with the rolls 11. The work piece is now moved in its position C longitudinally by the rolls 34 toward the lower end of Figure 1 until stopped by the work piece's end 38 striking the surface 39 of the stop-guide member 40 in its position shown in solid lines in Figure 1, which surface is inclined toward the upper end and the right hand side of said view.

The action on the work piece in its position C exerted by this member 40, the rolls 34 and the belts 2 is similar to that exerted by these belts, the stop-guide member 24 and the rolls 11 in the work piece's position on rolls 11, but as the work piece is moved laterally by the belts to its position D (shown in Figure 3 but omitted from Figure 1 for sake of clearness), on a third series of rolls 41 (journalled between the belts on bars 42 and parallelly with the other rolls, with their upper surfaces slightly above the belts), it is moved by these rolls 41 longitudinally away from said surface 39 and toward the upper end of Figure 1 until the work piece is stopped by its finished end 33 striking one of the stop members 44 (as member $44^1$) thus positioning the work piece properly for severing its opposite end portion 45 and providing a finished work piece of the desired length.

Thus positioned, the work piece, with its end 33 moving parallelly with the stop member $44^1$, is moved laterally by the belts to its position E wherein it is moved into and through the field of operation of severing means, the circular saw 46 whose sprocket wheel $29^1$ and the sprocket wheel $30^1$ of an electric motor 47 carry the driving belt $32^1$. Said end portion 45 is thus cut off and the work piece is reduced to the desired length with finished opposite ends 33, 49 at right angles to its side as seen in its final position E.

The rolls 41 are driven by an electric motor 43, said motor and the rolls having sprocket wheels $15^2$, $16^2$, $19^2$, $20^2$ and driving chain belts $18^2$ as shown similar to those shown in connection with the rolls 11 and 34.

The stop members 44 as illustrated in various positions in Figures 6, 7, 8, 9 and 10 are turnably mounted on a long shaft 50 turnable on posts 51, $51^1$ at the opposite ends of the machine. These stop members are spaced axially of this shaft at distances corresponding with the lengths of the finished work pieces; for instance, one set of stop members for work pieces of "even" feet lengths are spaced at two feet apart and at 6, 8, 10 feet, and so forth, from the saw 46, while another set for pieces of "odd" feet lengths are spaced also two feet apart but at 7, 9, 11 feet, and so forth, from the saw.

Each stop member has a heavier lower arm 52 with an angular extension 53 against whose side 54, (when turned down to its operative normal position shown in solid lines in Figure 8) the end 33 of the work piece strikes when it is moved longitudinally by the rolls 41, these stop members having also upper arms 55 provided with adjustable weights 56 for nearly counterbalancing the lower arms.

The stop members' collar portions 57 turnable on shaft 50 have open segmental portions. Inasmuch as the lumber work pieces are more usually cut to "even" feet lengths than to "odd" feet lengths, the open segmental portion of those members which are used in the cutting of "odd" feet lengths is of less angular extent, as shown at 58 in Figure 6, so that the radial pin 60 on the shaft by the turning thereof in counterclockwise direction strikes the upper side 59 of said portion to raise said stop member to inoperative position; but in those stop members which are used in the cutting of pieces of "even" feet lengths, the segmental portion $58^1$ as shown in Figure 7 is of greater angular extent so that the pin $60^1$ does not strike the upper side $59^1$ of said portion until the shaft has been turned farther.

In Figure 9 the shaft has been turned to raise the "odd" feet stops, leaving the "even" feet stops in operative position; and in Figure 10 the shaft has been turned farther thus raising all the stop members.

The shaft 50 may be turned by its hand wheel 61 and held in turned positions by thrusting the headed pin 62 through a hole in one of its spokes 63 and into one of the spaced holes 64, $64^1$, $64^2$ in the post 51. See Figure 4. The stop members are stopped from turning reversely by the long rod 65 extending between the posts 51, $51^1$.

As the work piece is moved laterally by the belts 2 from its position on rolls 34 to its position on rolls 41, its forward side or edge 66 strikes and turns upwardly the lower arms 52 of all the stop members which are between the saw 46 and that stop member (as stop member $44^1$) which is to stop the work piece in proper position for cutting the same to the desired length.

The shaft 50 for turning the stop members (or some of them) to inoperative position, when their use is not desired, is thus provided for eliminating the force otherwise expended for raising such stop members by said lateral movement of the work pieces.

When it is not desired to cut work pieces to certain lengths but merely to cut off or trim their portions near their ends 38 (which may be rough or imperfect) the stop-guide member 40 may be moved on the bars 66, 42 to its position shown in broken lines in Figure 1 and the motor 43 deenergized.

The vertical arms 22, $22^1$, $22^2$, of the belts 2 have rearwardly inclined side portions 67 to facilitate positioning the work pieces on the belts. The rolls may have their ends, toward which the work pieces are laterally moved, bevelled as shown at 68 in Figure 11 so that the work pieces may be readily slid onto these rolls.

In the modified construction of the machine illustrated by Figure 12, the saws $46^1$, $46^2$ may be moved on their shafts 69, 71 to the positions shown in solid lines and in broken lines, and the stop-guide 40¹ may be moved to its solid line and its broken line positions.

When the saws and stop-guide are in their solid line positions, the action of stop-guide 40¹, rolls 41¹, stops 53¹ and saw 46² on the work piece is the same as the action of stop-guide 40, rolls 41, stops 53 and saw 46 of the machine shown in Figure 1. In this instance, saw 46¹ may be stopped. When the saws and stop-guide of the modified construction shown in Figure 12 are in their broken line positions, stops 53¹ may be raised out of the path of the work piece, rolls 41¹ and saw 46² may be stopped, and the work piece is merely trimmed by saw 46¹ the work piece having been positioned for such trimming by the stop-guide 40¹. Saw 46² is driven by motor 72.

Figure 5:
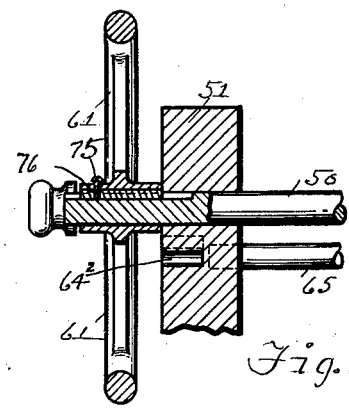
Figure 5 is a vertical sectional view of parts of the same, taken on line 5—5 of Figure 4.

It is sometimes desirable in saw mills to cut the lumber slightly in excess of its nominal length. For predetermining the desired overage, I provide means for manual endwise adjustment of the shaft 50 for thus increasing or decreasing the distances from the stop members 44 to the saw 46. These means comprise a longitudinally adjustable collar 73 secured by a set screw 74 on one end (the upper end in Figure 1) of shaft 50, and a set screw 75 threaded through the hub of hand wheel 61 and through the spline 76 by means of which the hand wheel is keyed to the shaft (see Figure 5).

While the machine as shown and described is complete in itself and may be used as an independent unit, it is contemplated that the same be built into the sorting table usually present at the delivery end of large saw mills. In instances where the present invention is so incorporated in the sorting mechanism, the lumber is delivered to and removed from the present machine automatically during the processing of the lumber and with no additional expense for labor.

In the modified construction of parts of the machine illustrated by Figures 13–20, a long hollow shaft 77 is turnable in the posts 78, 78¹ at the opposite ends of the machine by its hand wheel 79, this shaft being positioned on this post above the shaft of the saw 46. Split collars 80 spaced along this hollow shaft are held in adjusted turned positions thereon by the threaded bolts 81. Cords 82, 82¹ are fastened at one end in the eyes 83 of these collars and at their other ends to the lower arms 52 of the stop members 44, 44¹ respectively, the shorter cords 82 being fastened to the stop members 44 for lumber of odd-feet lengths and the cords 82¹ being fastened to the stop members 44¹ for lumber of even-feet lengths as shown in Figures 16 and 17.

By turning the hand wheel, preferably in clockwise direction, the stop members 44 for odd-feet lengths are raised from operative position as shown in Figure 16, and by turning the hand wheel farther the stop members 44¹ for even-feet lengths are also raised as shown in Figure 17.

Figure 4:
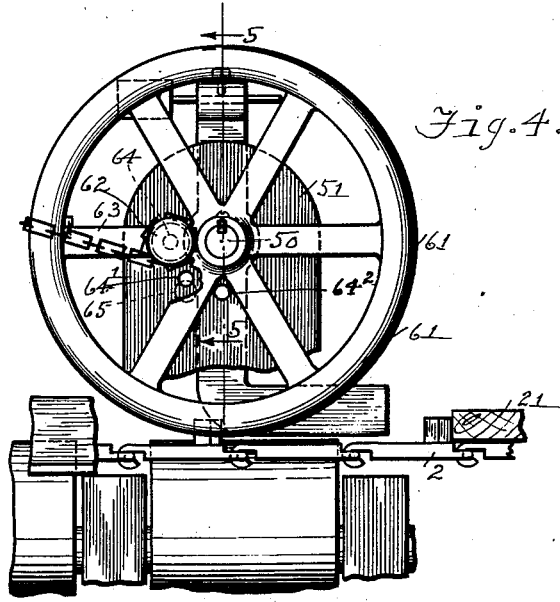
Figure 4 is a detail elevational end view (enlarged) of portions of the machine.

The shaft 77 may be held in turned positions by thrusting the headed pin 84 through a hole in a spoke of the hand wheel in the same manner as is shown in Figure 4.

The order in which the lumber moving means and severing means may if desired be changed somewhat from the order shown or described for effecting the same final result.

The invention being intended to be pointed out in the claims, is not to be limited to or by details of construction and arrangement of any particular embodiment thereof illustrated by the drawings or hereinbefore described.

I claim:

1. A machine of the class described for severing the opposite end portions of lumber and the like therefrom and for reducing the lumber to desired length comprising, in combination: means for moving the lumber longitudinally toward the rear end of the machine; means at said rear end for severing the lumber's end portion adjacent thereto; means at said rear end for stopping the movement of the lumber toward said rear end and for moving the lumber reversely to a position wherein its end portion adjacent said rear end registers with the severing means for severing the same; means for moving the lumber longitudinally toward the front end of the machine; severing means at said front end; means at said front end for stopping the movement of the lumber toward said front end; means for again moving the lumber longitudinally toward said rear end; a stop for stopping the second movement of the lumber toward said rear end, spaced from the second mentioned severing means a distance equal to the lumber's desired length; means for moving the lumber laterally from the first to the second and from the second to the third mentioned lumber moving means and through the field of operation of the first and second mentioned severing means, for severing the opposite end portions respectively of the lumber thereby and reducing the lumber to the desired length.

2. A machine of the class described for severing the opposite end portions of lumber or the like therefrom and for reducing the lumber to desired length comprising, in combination: a series of driven rolls for supporting and moving the lumber longitudinally toward the rear end of the machine; means at said rear end for severing the end portion of the lumber adjacent thereto; an inclined stop-guide at said rear end for stopping the movement of the lumber toward said rear end and for guiding the same in its lateral movement by the hereinafter mentioned belt conveyor to a reversely longitudinally moved position wherein its said end portion registers with the severing means for severing the same; a series of driven rolls for supporting and moving the lumber longitudinally toward the front end of the machine; means at said front end for stopping the movement of the lumber toward said front end; a series of driven rolls for supporting and again moving the lumber toward said rear end; a stop for stopping the second movement of the lumber toward said rear end, spaced from the second mentioned severing means a distance equal to the lumber's desired length; a driven belt conveyor for moving the lumber laterally from the first to the second and from the second to the third mentioned series of rolls and through the fields of operation of the first and second mentioned severing means, for severing the opposite end portions respectively of the lumber thereby and reducing the lumber to the desired length.

RUFUS F. VAN DEINSE.